US012177625B2

(12) United States Patent
Prince

(10) Patent No.: US 12,177,625 B2
(45) Date of Patent: Dec. 24, 2024

(54) HIGH PERFORMANCE LOUDSPEAKER ASSEMBLY

(71) Applicant: Panduit Corp., Tinley Park, IL (US)

(72) Inventor: David J. Prince, South Lyon, MI (US)

(73) Assignee: Panduit Corp., Tinley Park, IL (US)

( * ) Notice: Subject to any disclaimer, the term of this patent is extended or adjusted under 35 U.S.C. 154(b) by 225 days.

(21) Appl. No.: 17/898,587

(22) Filed: Aug. 30, 2022

(65) Prior Publication Data

US 2023/0082496 A1 Mar. 16, 2023

Related U.S. Application Data

(60) Provisional application No. 63/261,175, filed on Sep. 14, 2021.

(51) Int. Cl.

*H04R 1/24* (2006.01)
*H04R 1/02* (2006.01)
*H04R 1/28* (2006.01)

(52) U.S. Cl.

CPC ............... *H04R 1/24* (2013.01); *H04R 1/023* (2013.01); *H04R 1/2803* (2013.01)

(58) Field of Classification Search

CPC ........ H04R 1/24; H04R 1/023; H04R 1/2803; H04R 9/06; H04R 1/2826; H04R 1/26; H04R 1/025; H04R 1/345; H04R 1/2819; H04R 9/00; H04R 1/02; H04R 29/00; H04R 1/1075; H04S 3/008; H04S 3/004

See application file for complete search history.

(56) References Cited

U.S. PATENT DOCUMENTS

| | | | | |
|---|---|---|---|---|
| 2,544,742 | A | 3/1951 | Volf | |
| 3,688,864 | A | 9/1972 | Guss | |
| 5,073,945 | A | 12/1991 | Kageyama et al. | |
| 5,307,418 | A * | 4/1994 | Sumitani .............. | H04R 1/2819 381/349 |
| 5,561,717 | A | 10/1996 | Lamm | |
| 5,874,695 | A | 2/1999 | Tracy | |
| 6,719,090 | B2 | 4/2004 | Tracy | |
| 7,551,749 | B2 | 6/2009 | Rosen et al. | |
| 7,817,814 | B2 * | 10/2010 | Yang .................... | H04R 1/1075 381/382 |
| 7,840,018 | B2 | 11/2010 | Prenta et al. | |
| 7,983,436 | B2 | 7/2011 | Nichols et al. | |
| 8,000,490 | B2 * | 8/2011 | Yang ........................ | H04S 3/004 381/370 |
| 8,259,983 | B2 | 9/2012 | Nedelcu | |
| 8,477,966 | B2 | 7/2013 | Prenta et al. | |
| 10,652,638 | B2 | 5/2020 | Sterling | |

(Continued)

FOREIGN PATENT DOCUMENTS

| | | | | |
|---|---|---|---|---|
| CN | 209419770 U * | 9/2019 | ............... | H04R 1/02 |
| JP | 2017175245 A * | 9/2017 | ............. | H04R 29/00 |

*Primary Examiner* — Angelica M McKinney

(74) *Attorney, Agent, or Firm* — Peter S. Lee; Christopher S. Clancy; James H. Williams

(57) ABSTRACT

This disclosure is related to a speaker assembly having a design configured to output the higher performance of a larger speaker, while maintaining the dimensions (e.g., speaker opening) of a traditional small speaker. The speaker assembly includes a plurality of low frequency drivers transversely installed to each other and arranged orthogonal to a separate high frequency driver.

18 Claims, 7 Drawing Sheets

(56) References Cited

U.S. PATENT DOCUMENTS

| | | | | |
|---|---|---|---|---|
| 2004/0218775 | A1 * | 11/2004 | Huang | H04R 1/1075 381/186 |
| 2006/0213718 | A1 * | 9/2006 | Lowell | H04R 9/00 181/152 |
| 2006/0280328 | A1 * | 12/2006 | Nakagawa | H04R 1/345 381/388 |
| 2016/0212521 | A1 * | 7/2016 | Huang | H04R 1/24 |
| 2018/0343521 | A1 * | 11/2018 | Ashrafzadeh | H04S 3/008 |
| 2019/0037303 | A1 * | 1/2019 | Peace, Jr | H04R 1/345 |
| 2020/0236450 | A1 | 7/2020 | Sterling | |
| 2020/0404420 | A1 * | 12/2020 | Malsky | H04R 1/24 |

* cited by examiner

HIGH PERFORMANCE LOUDSPEAKER ASSEMBLY

CROSS-REFERENCE TO RELATED APPLICATION(S)

This application claims benefit to U.S. Provisional Patent App. No. 63/261,175, filed on Sep. 14, 2021, the entirety of which is hereby incorporated by reference herein.

TECHNICAL FIELD

This disclosure is related to a speaker assembly having a design configured to produce the higher performance of a larger speaker, while maintaining the dimensions (e.g., speaker opening) of a traditionally smaller speaker assembly.

BACKGROUND

High performance loudspeaker systems generally require two or more loudspeaker drivers to cover a wide frequency bandwidth since it is difficult for one driver to cover all the audio bandwidth radiating into free space. For acoustic reasons, the speaker drivers that handle lower frequencies (i.e., the sub-woofers that handle bass) are typically larger in size compared to speaker drivers that handle higher frequencies (i.e., the tweeter that handle high frequencies), thus resulting in a direct size to bass performance relationship for speaker drivers.

As high performance speakers are generally considered to be capable of handling lower bass frequencies down to 40 Hz, the typical size for such speaker drivers is large. While there are known space optimization designs such as placing the higher frequency driver in front of the lower frequency driver (i.e., a co-axial arrangement), the space area of the lower frequency driver still maintains its larger size. Thus the footprint of the overall loudspeaker system remains large as it is constricted by the large size of the lower frequency driver. Furthermore, when including acoustic enclosure porting elements into the loudspeaker system to extend low frequency performance, this adds additional spacing to the size of the loudspeaker system. For example, a typical ceiling loudspeaker assembly approaching high performance output may be housed in an enclosure that is 9" diameter or larger.

It follows that there is a conflict between the larger physical dimensions that are typically required for high performance speaker systems, and the smaller design footprint desired by designers for aesthetic purposes. Therefore, this disclosure provides for a high performance speaker assembly that may be assembled into a smaller housing to decrease the overall size (e.g., visual size) compared to existing speaker assemblies.

SUMMARY

This disclosure relates to a high performance speaker assembly designed with components assembled into an arrangement that allow for a smaller overall footprint when compared to other speaker assemblies.

According to some embodiments, a speaker assembly is disclosed that comprises a top cover including a grill opening, a grill cover configured to secure to the top cover and cover over the grill opening, a base housing comprising: a first holding area, a second holding area, and a third holding area. The speaker assembly further comprises a high frequency driver configured to be housed within the first holding area, a first low frequency driver configured to be housed within the second holding area, and a second low frequency driver configured to be housed within the third holding area.

BRIEF DESCRIPTION OF THE DRAWINGS

To understand the present disclosure, it will now be described by way of example, with reference to the accompanying drawings in which.

DETAILED DESCRIPTION

Figure 1:
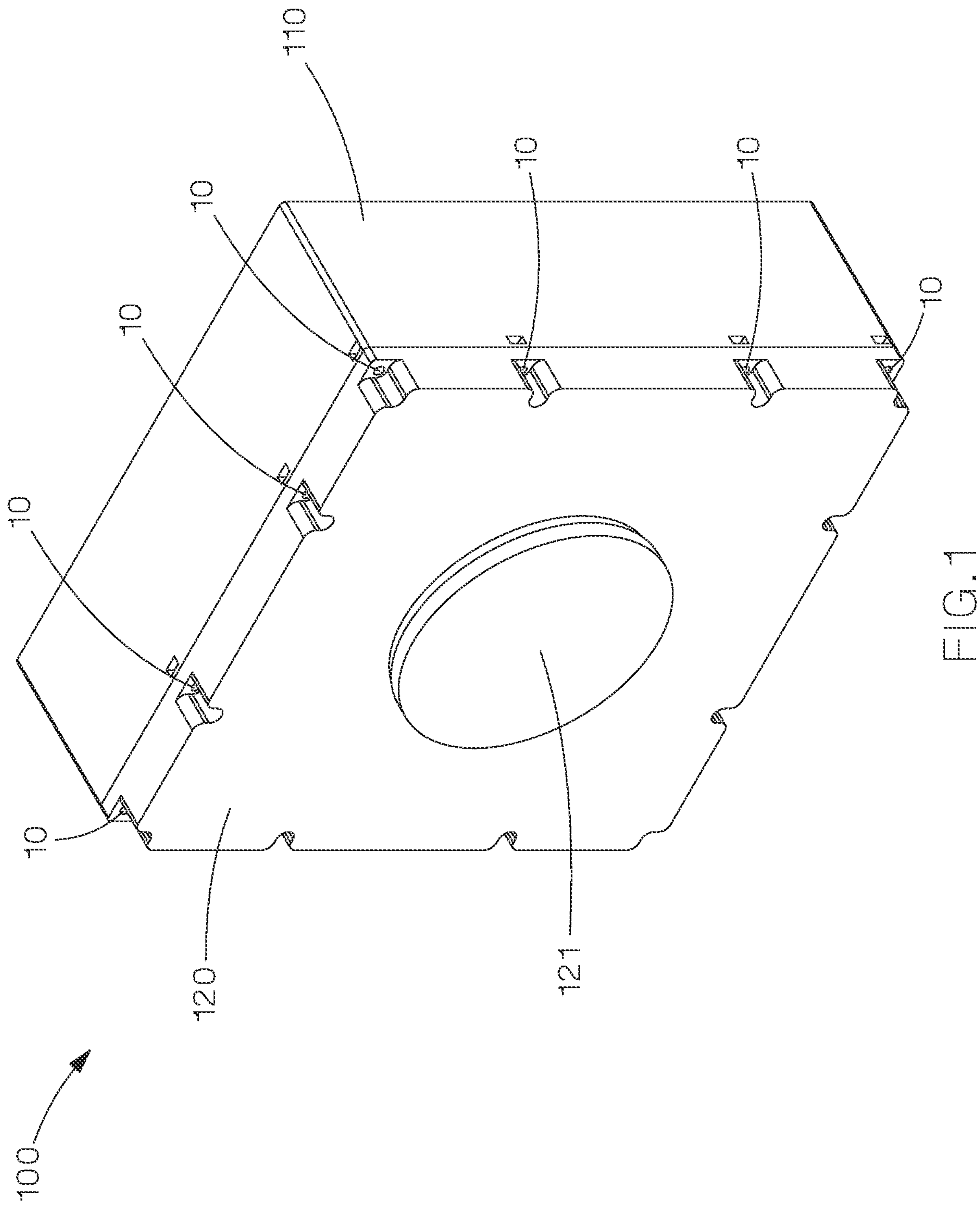
FIG. 1 is a perspective view of a speaker assembly, according to an embodiment.

While the described features are provided for embodiments in many different forms, there is shown in the drawings and will herein be described in detail preferred embodiments with the understanding that the present disclosure is to be considered as an exemplification of the principles of the features and is not intended to limit the broad aspect of the features to the embodiments illustrated.

As required, detailed embodiments are disclosed herein; however, it is to be understood that the disclosed embodiments are merely exemplary of the inventive features that may be embodied in various and alternative forms that include additional, or fewer, components and/or steps. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The disclosed speaker assembly is described as including components that are assembled together to produce high performance speaker qualities within a smaller enclosure (i.e., fits within a smaller visual opening) than other similarly performing speaker assemblies. In particular, the disclosed speaker assembly is able to utilize smaller speaker components (i.e., differently shaped components from conventional speakers) to achieve the smaller overall size (e.g., shallower geometry), while still achieving high performance speaker qualities. The speaker assembly referenced herein is a ceiling install type speaker assembly, although other embodiments of the speaker embodiments that may not include ceiling installation are within the scope of this disclosure. The exemplary embodiments may describe the speaker assembly as being a ceiling speaker assembly, but other applications for the speaker assembly are also applicable and within the scope of this disclosure. For example, instead of mounting to a structure, the speaker assembly may be a standalone box structure such as a bookshelf speaker or desktop speaker, or even an in-wall speaker.

Figure 2:
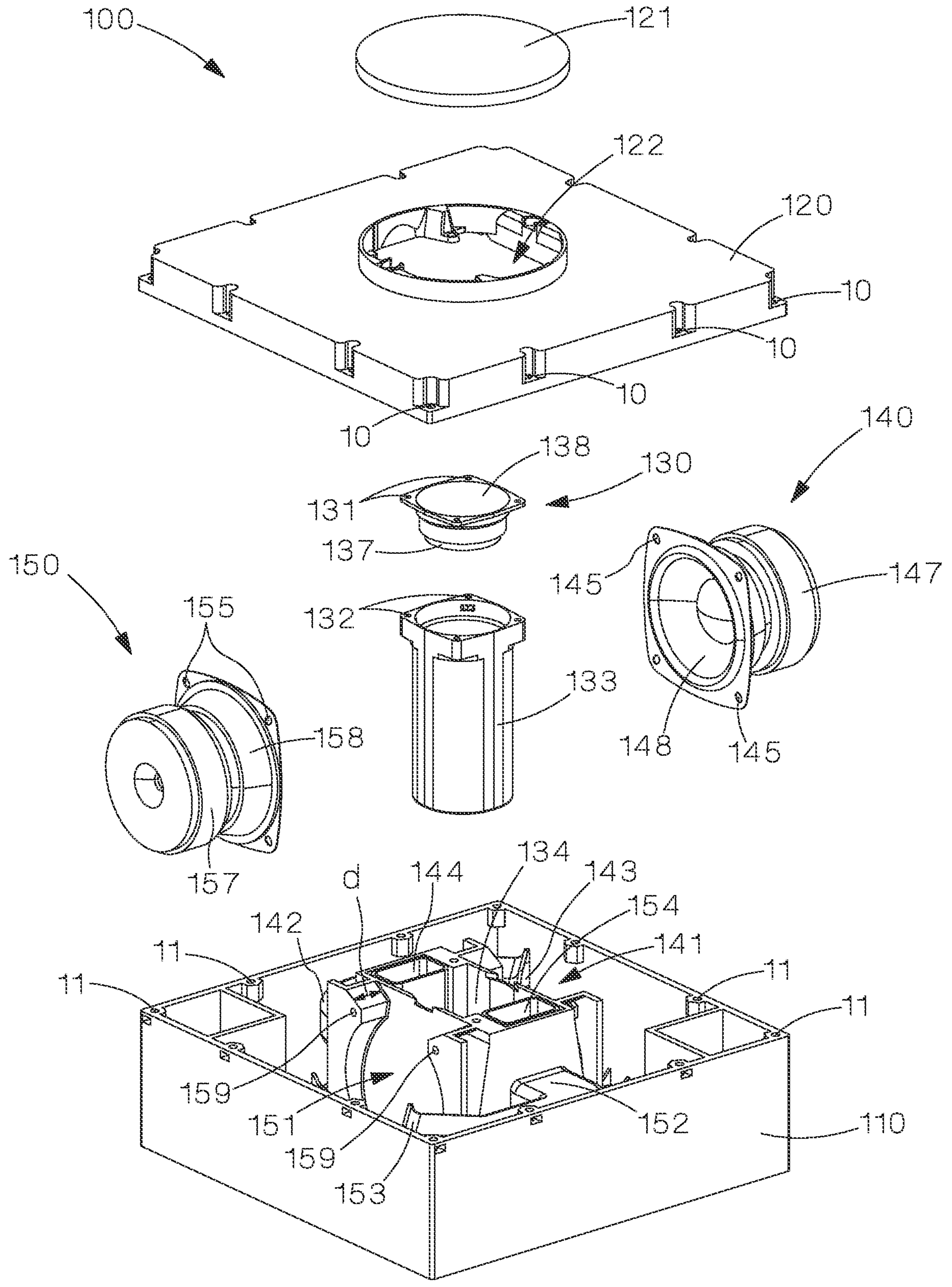
FIG. 2 is an exploded view of the speaker assembly shown in FIG. 1, according to an embodiment.

Referring generally to the figures, FIG. 1 shows a perspective view of a speaker assembly 100. The speaker assembly 100 includes a base housing 110, a top cover 120, and a grill cover 121. As shown in FIG. 2, the grill cover 121 is configured to be releasably attached to a grill opening 122 included on the top cover 120. When the grill cover 121 is removed to expose the grill opening 122, the grill opening 122 provides an open view into the base housing 110 where a high frequency driver 130 is installed directly under the grill opening 122. Also shown in FIG. 1 are a plurality of fastener holes 10 for receiving a fastener (e.g., screw). Each of the fastener holes 10 line up to a corresponding fastener hole 11 on the base housing 110 so that when a fastener is inserted through the fastener hole 10 on the top cover 120 and the corresponding fastener hole 11 on the base housing 110, the top cover 120 and the base housing 110 are secured together. The plurality of fasteners holes 10, 11 may be, for example, at least four fastener holes 10, 11 to be placed in at least each of the four corners of the speaker assembly 100.

FIG. 2 shows an exploded view of the speaker assembly 100 that further illustrates internal components housed within the base housing 110. The grill cover 121 is made to be releasably attached to the grill opening 122, although in some embodiments the grill cover 121 may be more permanently attached to the grill opening 122 by direct molding, adhesive, or use of fasteners to secure the grill cover 121 to the grill opening 122.

The high frequency driver 130 includes a bottom-end where a magnet driver 137 is located, and a top-end where a cone 138 is located. The high frequency driver 130 is configured to fit into and be secured to a holding cylinder 133, by inserting the bottom-end where the magnet driver 137 is located into the holding cylinder 133. The holding cylinder 133 is then configured to fit into a first holding area 134 of the base housing 110. The high frequency driver 130 further includes fastener holes 131 that are configured to line up with corresponding fastener holes 132 included in the holding cylinder 133, such that when a fastener is inserted into the fastener hole 131 and through the corresponding fastener hole 132 on the holding cylinder 133, the high frequency driver 130 is secured to the holding cylinder 133.

A first low frequency driver 140 is configured to be installed into a second holding area 141 of the base housing 110. The first low frequency driver 140 includes a magnet motor assembly (hereinafter "magnet") 147 at a bottom-end and a cone 148 at a top-end. The first low frequency driver 140 also includes a plurality (e.g., four, one for each corner) of fastener holes 145 that are part of a frame surrounding the opening to the cone 148. Each fastener hole 145 is configured to line up to a corresponding fastener hole (not illustrated) in the base housing 110 so that when a fastener is inserted and secured through the fastener hole 145 and the corresponding fastener hole (not illustrated) in the base housing 110, the first low frequency driver 140 is secured to the base housing 110 within the second holding area 141.

A second low frequency driver 150 is configured to be installed into a third holding area 151 of the base housing 110. The second low frequency driver 150 includes a magnet motor assembly (hereinafter "magnet") 157 at a bottom-end and a cone 158 at a top-end. The second low frequency driver 150 also includes a plurality (e.g., four, one for each corner) of fastener holes 155 that are part of a frame surrounding the opening to the cone 158. Each fastener hole 155 is configured to line up to a corresponding fastener hole 159 in the base housing 110 so that when a fastener is inserted and secured through the fastener hole 155 and the corresponding fastener hole 159 in the base housing 110, the second low frequency driver 150 is secured to the base housing 110 within the third holding area 151. Both the first low frequency driver 140 and the second low frequency driver 150 may utilize shallow, oval or elliptical shaped, cones 148, 158.

Figure 5:
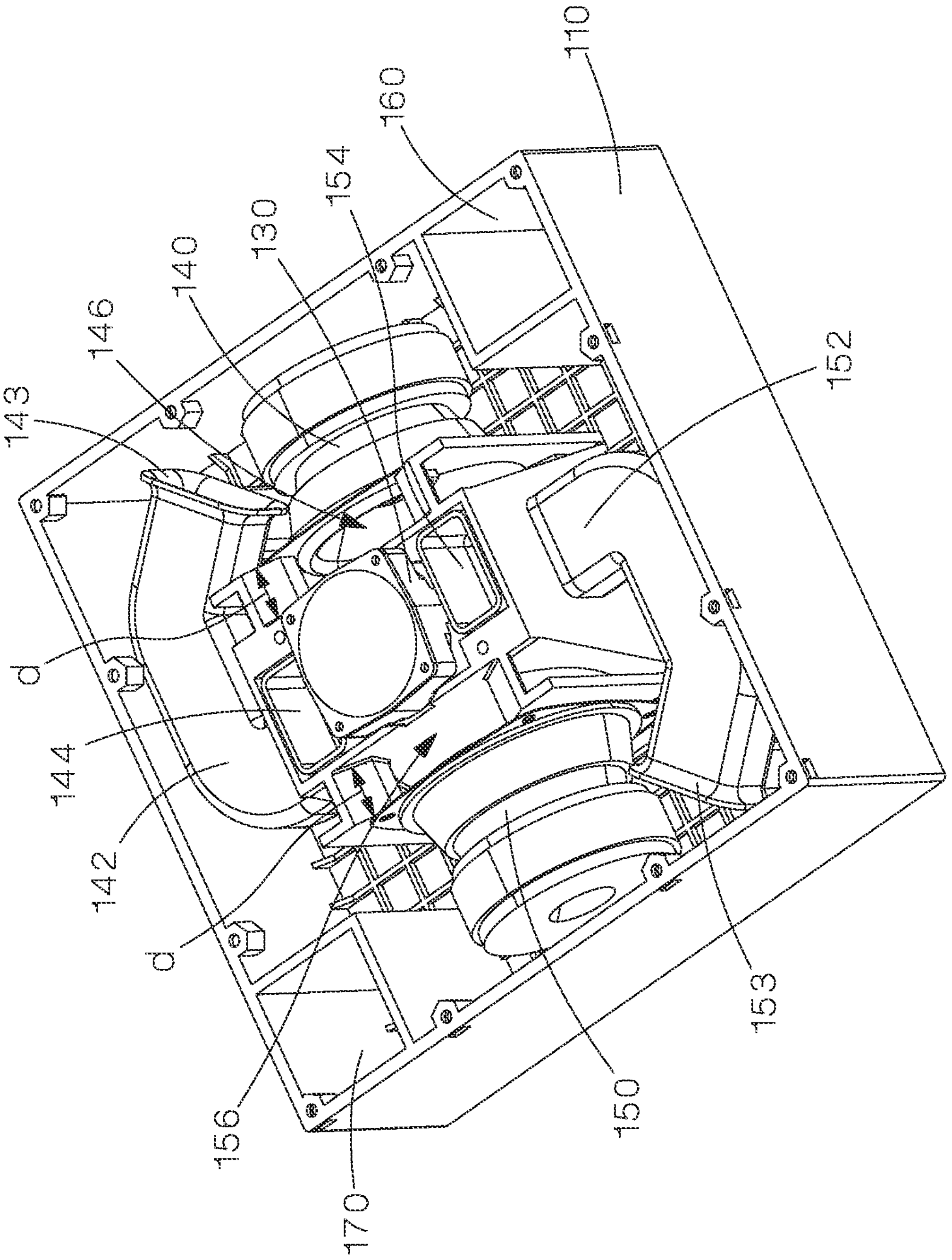
FIG. 5 is a perspective view of the speaker assembly from FIG. 3, where a top cover has been removed from view.

Inside the base housing 110 are also a first resonant tube 142 and a second resonant tube 152. FIG. 5 shows a perspective view of the speaker assembly 100 with the top cover 120 removed to allow a better view into the components that are housed within the base housing 110, including the first resonant tube 142 and the second resonant tube 152. The first resonant tube 142 includes an acoustic input opening positioned to open towards the first low frequency driver 140 when the first low frequency driver 140 is housed within the second holding area 141. It follows that the acoustic input opening 143 is configured to receive acoustic sound produced from the first low frequency driver 140 into the acoustic input opening 143 and channel it through the first resonant tube 142 to be output at an acoustic output opening 144. The acoustic output opening 144 is positioned adjacent to the high frequency driver 130 when the high frequency driver 130 is housed within its holding cylinder 133. This placement of the acoustic output opening 144 allows for the acoustic sound from the first low frequency driver 140 to be routed through the first resonant tube 142 and be output through the grill opening 122 along with the acoustic sound from the high frequency driver 130.

The second resonant tube 152 includes an acoustic input opening 153 positioned to open towards the second low frequency driver 150 when the second low frequency driver 150 is housed within the third holding area 151. It follows that the acoustic input opening 153 is configured to receive acoustic sound produced from the second low frequency driver 150 into the acoustic input opening 143 and channel it through the second resonant tube 152 to be output at an acoustic output opening 154. The acoustic output opening 154 is positioned adjacent to the high frequency driver 130 when the high frequency driver 130 is housed within its holding cylinder 133. This placement of the acoustic output opening 154 allows for the acoustic sound from the second low frequency driver 150 to be routed through the second resonant tube 152 and be output through the grill opening 122 along with the acoustic sound from the high frequency driver 130.

Figure 7:
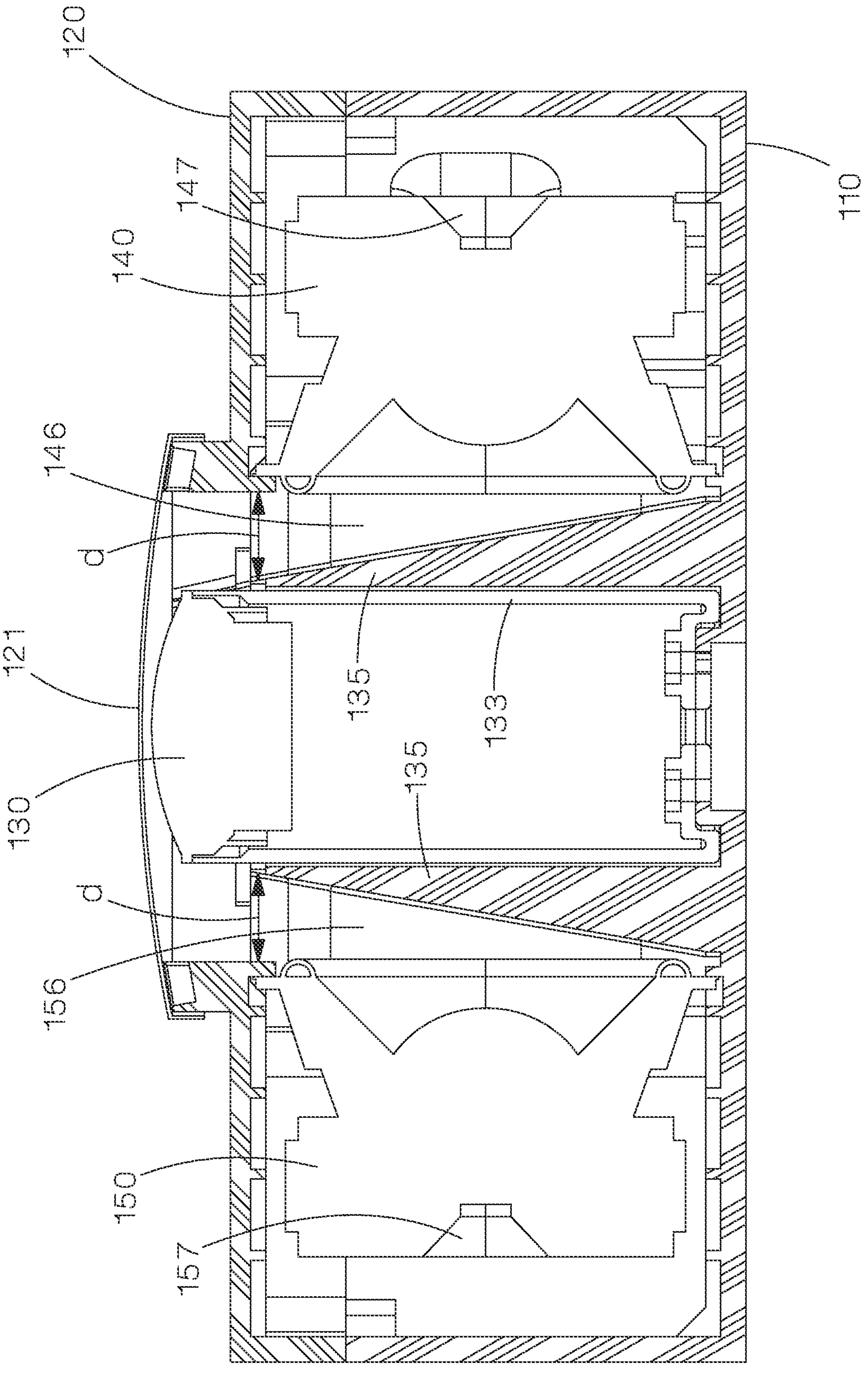
FIG. 7 is a side view of the speaker assembly taken along the cut line 7-7 from FIG. 3.

When the first low frequency driver 140 is installed into the second holding area 141, there is a first space 146 that is created between the first low frequency driver 140 and a center wall 135 forming the first holding area 134 that holds the high frequency driver 130, as shown in FIG. 7. As shown in FIG. 5, the top opening to the first space 146 opens up towards the grill opening 122 so that the displaced air produced from the first low frequency driver 140 is reflected off the center wall 135 and up through the grill opening 122. The top opening to the first space 146 is defined by an area having a first length equal to the distance d by a second length equal to, or at least sufficiently matching, a diameter h of the first low frequency driver 140 (e.g., area of the top opening=d*h). The area of the top opening to the first space 146 may be adjusted by adjusting the distance d; however, the area of the top opening will be configured to be less than the area of the woofer in the first low frequency driver 140.

When the second low frequency driver 150 is installed into the third holding area 151, there is a second space 156 that is created between the second low frequency driver 150 and the center wall 135 forming the first holding area 134 that holds the high frequency driver 130, as shown in FIG. 7. As shown in FIG. 5, the top opening to the second space 156 opens up towards the grill opening 122 so that the displaced air produced from the second low frequency driver 150 is reflected off the center wall 135 and up through the grill opening 122. The top opening to the second space 156 is defined by an area having a first length equal to the distance d by a second length equal to, or at least sufficiently matching, a diameter h of the second low frequency driver 150 (e.g., area of the top opening=d*h). The area of the top opening to the second space 156 may be adjusted by adjusting the distance d; however, the area of the top opening will be configured to be less than the area of the woofer in the second low frequency driver 150.

Also shown within the inner housing of the base housing 110 are a first housing area 160 and a second housing area 170 located in corners where the first resonant tube 142 and the second resonant tube 152 are not present. According to other embodiments, a fewer, or larger, number of housing areas may be included within the base housing 110 to adjust the interior volume of the speaker assembly 100. While the first housing area 160 and the second housing area 170 are shown to have a cube shape, according to other embodiments they may be formed into different shapes. According to other embodiments, the first housing area 160 and/or the second housing area may be removed to adjust a desired interior volume of the speaker assembly 100.

Figure 4:
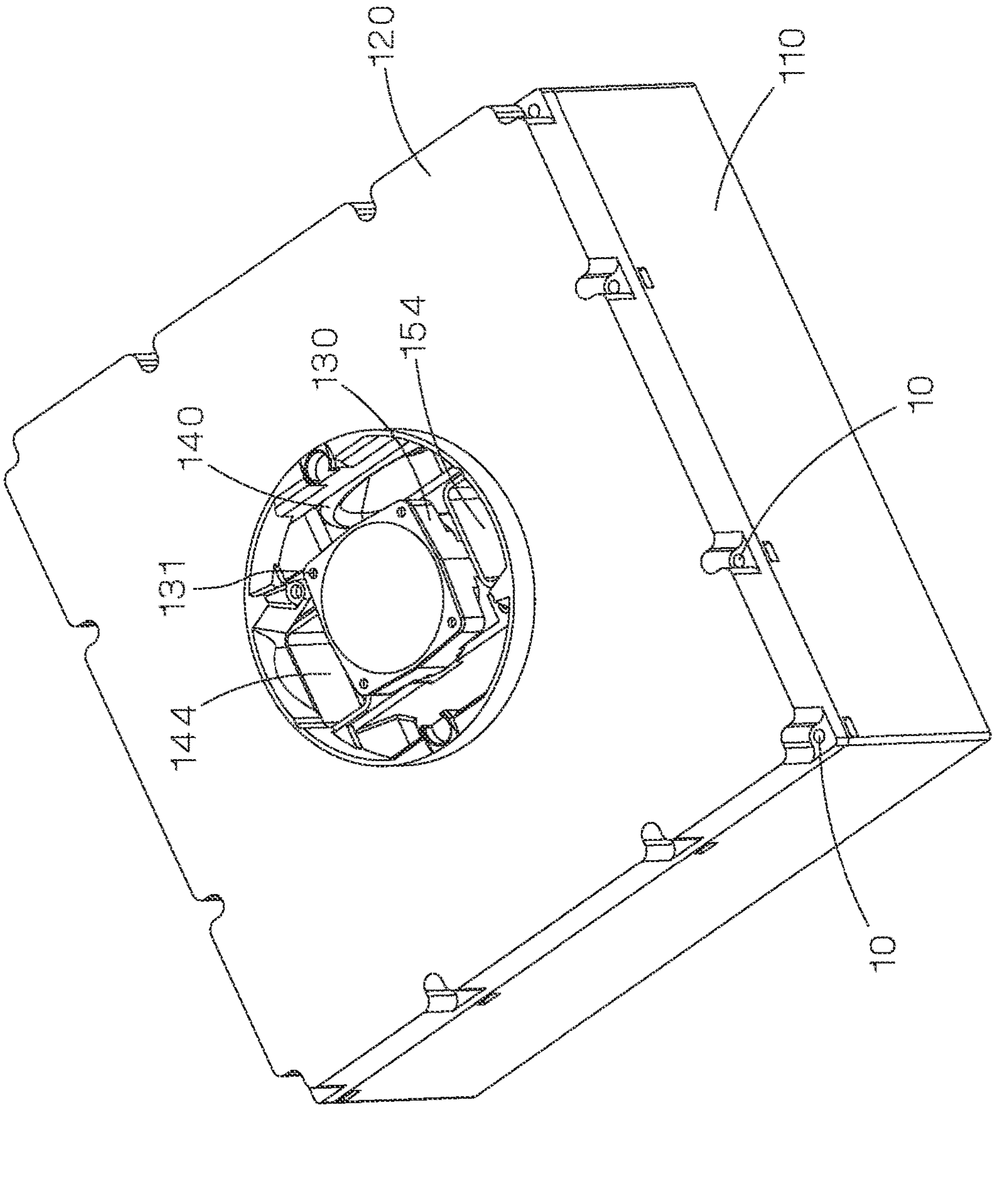
FIG. 4 is a perspective view of the speaker assembly from FIG. 3, where a grill cover has been removed from view.

As discussed, when the speaker assembly 100 is in the assembled state the acoustic output opening 144, the acoustic output opening 154, the top opening to the first space 146, the top opening to the second space 156, and the high frequency driver 130 are all positioned to output sound through the grill opening 122. For example, FIG. 4 shows the speaker assembly 100 with the grill cover 121 removed, thus revealing the acoustic output opening 144, the acoustic output opening 154, and the high frequency driver 130 showing through within the grill opening 122 so that acoustic sounds from the acoustic output opening 144, the acoustic output opening 154, the top opening to the first space 146, the top opening to the second space 156, and the high frequency driver 130 are output through the grill opening 122.

Figure 6:
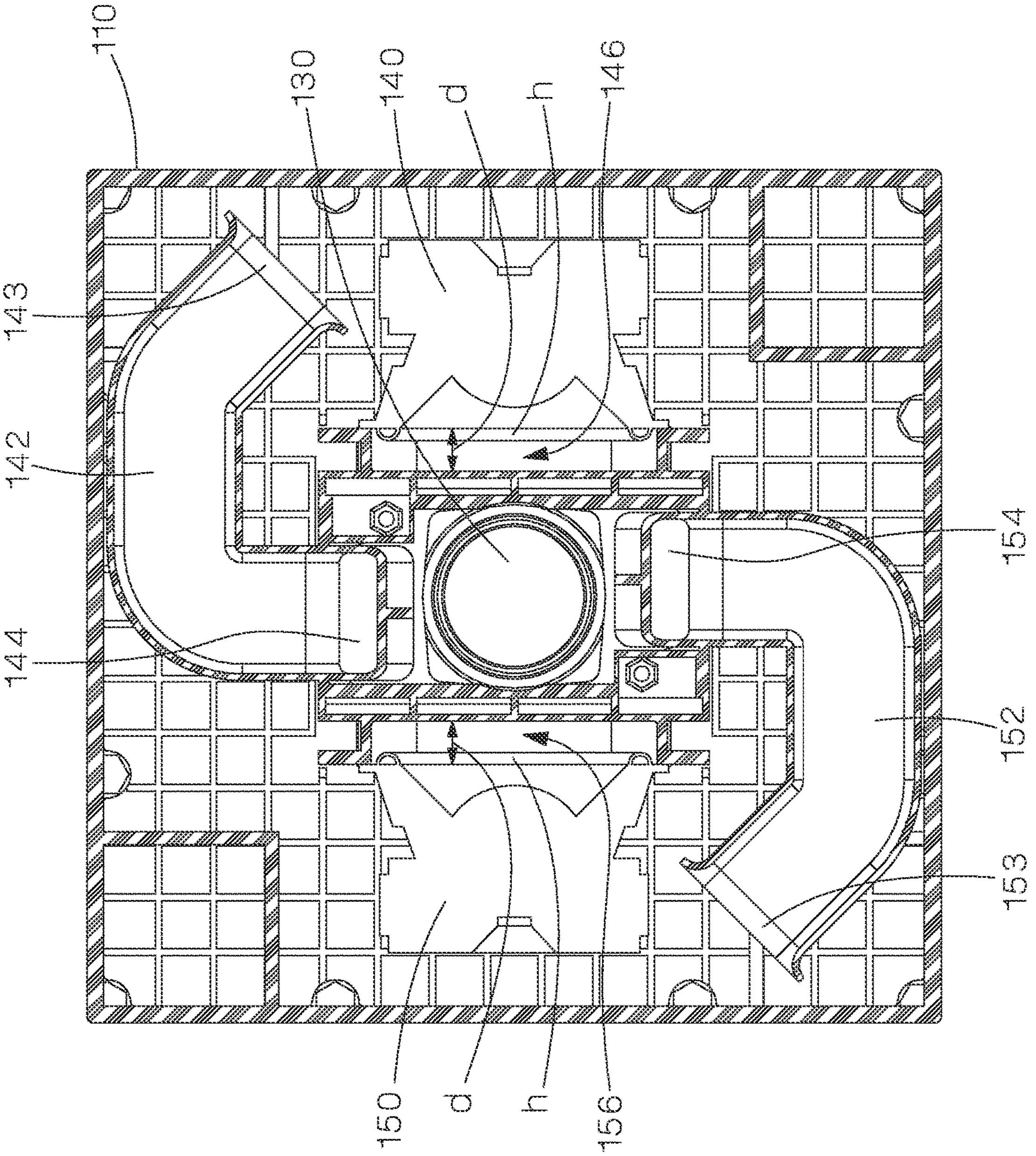
FIG. 6 is a top down view into the speaker assembly taken along the cut line 6-6 from FIG. 3.

FIG. 5 also includes a cut line 6-6 of the speaker assembly 100, that will be discussed in more detail with reference to FIG. 6. In FIG. 6, a top down view of the speaker assembly 100 is shown along the cut line 6-6 from FIG. 5. With this top down view of the speaker assembly 100, the routing paths of the first resonant tube 142 and the second resonant tube 152 are better outlined. The top down view of the speaker assembly 100 shown in FIG. 6 also illustrates the positional relationships between the different components that are housed within the base housing 110. In particular, FIG. 6 shows the position of the acoustic input opening 143 relative to the first low frequency driver 140 so that the acoustic sounds from the first low frequency driver 140 are received through the acoustic input opening 143, travel through the tubing of the first resonant tube 142, and output from the acoustic output opening 144 next to the high frequency driver 130. FIG. 6 also shows the position of the acoustic input opening 153 relative to the second low frequency driver 150 so that the acoustic sounds from the second low frequency driver 150 are received through the acoustic input opening 153, travel through the tubing of the second resonant tube 152, and output from the acoustic output opening 154 next to the high frequency driver 130.

The top down view shown in FIG. 6 also illustrates the positional relationships between the acoustic output opening 144 and the high frequency driver 130 being a distance d apart, as well as the acoustic output opening 154 and the high frequency driver 130 being a distance d apart. The relational spacing and positioning of the components within the base housing 110 has been intentionally configured to enable the small form factor of the speaker assembly 100.

Figure 3:
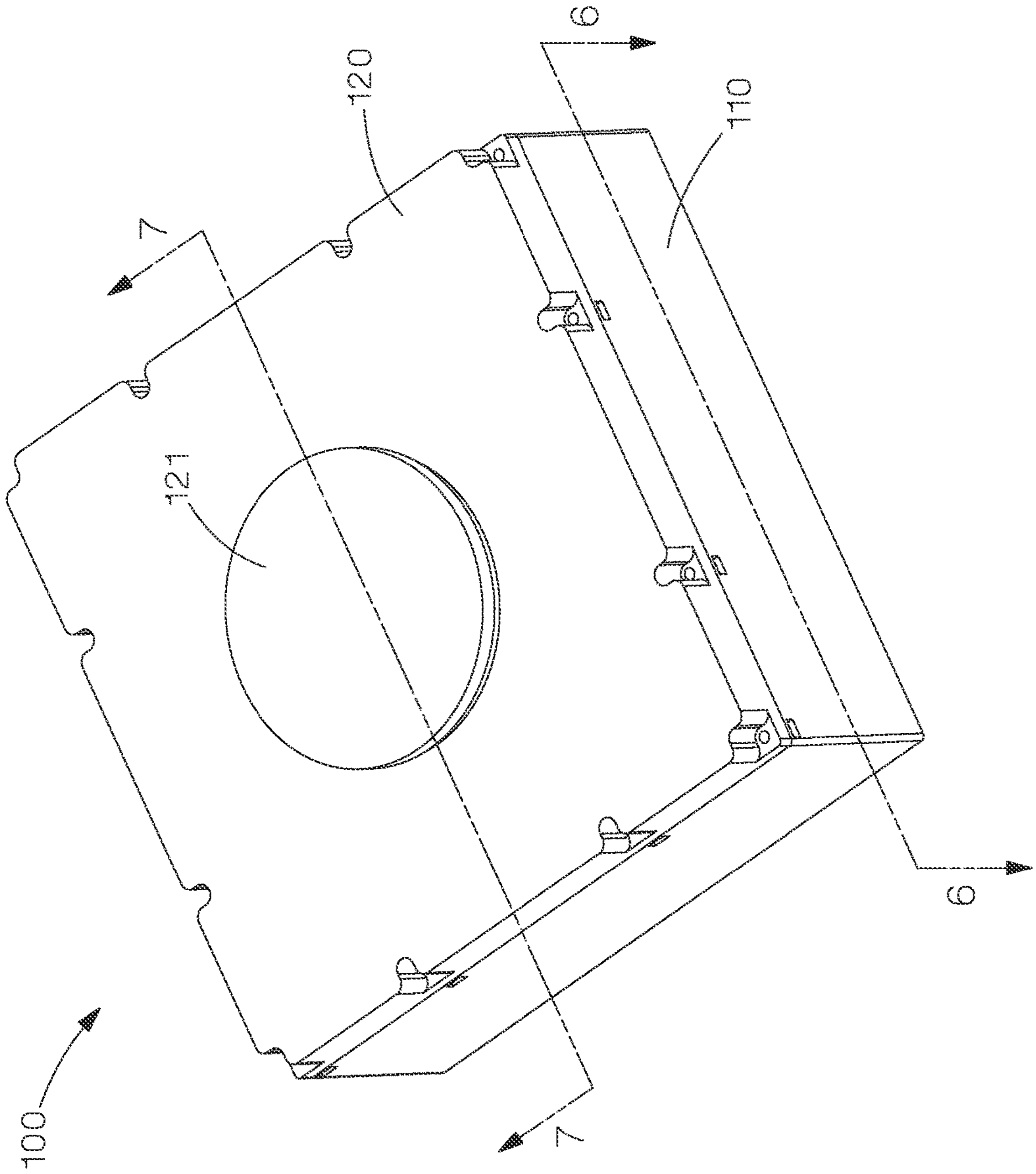
FIG. 3 is another perspective view of the speaker assembly, including cut line 6-6 corresponding to FIG. 6 and cut line 7-7 corresponding to FIG. 7.

FIG. 3 is another perspective view of the speaker assembly 100 in the assembled state, where cut line 7-7 is illustrated for later reference. In FIG. 7, a cut sectional view of the speaker assembly is shown taken along the cut line 7-7 from FIG. 3. As shown in FIG. 7, the grill cover 121 is secured around the grill opening 122 and covers the high frequency driver 130. From the view shown in FIG. 7, the high frequency driver 130 is secured on top of the holding cylinder 133, where the holding cylinder 133 is hollow.

With the configuration of components disclosed for the speaker assembly 100, the first low frequency driver 140 and the second low frequency driver 150 are arranged symmetrically opposed to each other, as well as being orthogonal to the grill opening 122 where the acoustic sound is emitted out from. The size of the grill opening 122 is made to be small, on the order of less than, or equal to, half the area of the first low frequency driver 140 or the second low frequency driver 150 (where the first low frequency driver 140 and the second low frequency driver 150 share the same physical and performance attributes). By arranging and configuring the components in this manner, the requirements for the radiated grill opening 122 is much smaller than what would have been required for more traditional designs, thus allowing for a smaller form factor having a more appealing aesthetic as a speaker design (e.g., ceiling speaker). For example, whereas traditional designs would require a 9" opening for the grill opening 122, the current design of the speaker assembly would enable the same high performance while bringing the size of the grill opening 122 down to around 4.5". For example, according to exemplary embodiments the dimensions of the speaker assembly 100 may be 10"×10"×3.5". The shallow depth of the speaker assembly 100 is possible by transverse mounting the first low frequency driver 140 and the second low frequency driver 150. Although the exemplary embodiments include two low frequency drivers, additional pairs of low frequency drivers may be added that are transversely mounted to each other.

The use of shallow, oval or elliptical shaped, cones 148, 158 for the first low frequency driver 140 and the second low frequency driver 150, respectively, allows for a more shallow (in depth) structure for the speaker assembly 100, thus further reducing its overall size. Furthermore, the use of the shallow, oval or elliptical shaped, cones 148, 158 for the first low frequency driver 140 and the second low frequency driver 150, along with their respective first resonant tube 142 and second resonant tube 152, is able to achieve similar air volume velocity (i.e., area of a cone*displacement of the cone) when compared to a single larger circular cone speaker. For example, two 3×5" woofer cone speakers are able to achieve similar air volume velocity as a single 6.5" woofer cone speaker.

In operation, the first low frequency driver 140 and the second low frequency driver 150 are driven (i.e., moved) in equal and opposite directions so their vibrational energy is not, or at least much limited, transferred outside the speaker assembly 100 to any adjacent structures. This feature is especially advantageous when the speaker assembly 100 is mounted in a ceiling such as a lightweight ceiling tile structure.

A known defect in conventional two-way speaker systems that include both a high and low frequency driver, is that they cross-over between frequency coverage ranges around 2 kHz and 5 kHz. This creates an objectionable phase and radiation response in the most sensitive area of human hearing. So when the crossover point for these traditional two-way speaker systems are around 4 kHz, this is right in the range of the most sensitive part of the human hearing system and phase response changes and shifts in the driver radiation patterns within this range will be audible, and thus degrade the listening experience. Unlike these traditional two-way speaker systems, the crossover point for the speakers in the speaker assembly 100 are lowered to be below the sensitive range between 2 kHz and 5 kHz. Lowering the crossover point allows the drivers (i.e., woofers) more flexibility in configuration with longer wavelengths of sound which are less sensitive to geometry conditions. A larger high frequency driver then handles the entire critical vocal range for the speaker assembly 100, thus allowing better intelligibility and phase coherence as the crossover point is moved out from the middle of the vocal range.

Furthermore, balanced bi-amplification is enabled by the arrangement of the components in the speaker assembly 100. For example, using a larger full range driver instead of a traditional tweeter for the high frequency driver 130 with an extension down to 250 Hz allows the power to be evenly split for most program material. So instead of having 12 dB imbalance on the amplifier channels, the speaker assembly 100 is now left with only a 1-2 dB difference. Using the larger full range driver with a frequency range of 300-18000 Hz for the high frequency driver 130 instead of a dedicated tweeter as typically used in traditional speakers, further allows for the shallow depth geometry of the speaker assembly 100 being 3.5" or less.

While the specific embodiments have been illustrated and described, other modifications may be applied without significantly departing from the spirit of the disclosure, and the scope of protection is only limited by the scope of the accompanying claims. For example, according to some embodiments the resonant tubes may be removed from the interior of the base housing 110. According to some embodiments one or more of the walls comprising the base housing 110 may be removed and substituted with parts of a structure onto which the speaker assembly 100 is mounted or installed. According to some embodiments, the configuration design of the speaker assembly 100 may be revised to remove the second low frequency driver 150 so that it includes only the first low frequency driver 140 and the high frequency driver 130.

What is claimed is:

1. A speaker assembly comprising:
a top cover including a grill opening;
a grill cover configured to secure to the top cover and cover over the grill opening;
a base housing comprising:
a first holding area;
a second holding area; and
a third holding area;
a high frequency driver configured to be housed within the first holding area;
a first low frequency driver configured to be housed within the second holding area;
a second low frequency driver configured to be housed within the third holding area;
a first resonant tube comprising:
an acoustic input opening configured to receive acoustic sound from the first low frequency driver; and
an acoustic output opening configured to output the acoustic sound received from the first low frequency driver, wherein the acoustic output opening is positioned next to the high frequency driver;
a second resonant tube comprising:
an acoustic input opening configured to receive acoustic sound from the second low frequency driver; and
an acoustic output opening configured to output the acoustic sound received from the second low frequency driver, wherein the acoustic output opening is positioned next to the high frequency driver.

2. The speaker assembly of claim 1, wherein the first low frequency driver and the second low frequency driver are installed opposite each other and both the first low frequency driver and the second low frequency driver are transversely orthogonal to the high frequency driver.

3. The speaker assembly of claim 1, wherein the first low frequency driver and the second low frequency driver are installed opposite each other and the first low frequency driver is driven so that a motion of the first low frequency driver is opposite to a motion of the second low frequency driver.

4. The speaker assembly of claim 1, wherein the acoustic output opening of the first resonant tube, the acoustic output opening of the second resonant tube, and the high frequency driver are configured to fit through the perimeter of the grill opening.

5. The speaker assembly of claim 1, wherein a crossover point between the first low frequency driver and the high frequency driver is lower than 2 kHz.

6. The speaker assembly of claim 1, wherein the high frequency driver is a full range driver having a frequency range between at least 300-18000 Hz.

7. The speaker assembly of claim 1, wherein a depth of the speaker assembly is less than or equal to 3.5 inches.

8. The speaker assembly of claim 1, wherein the speaker assembly is in a square shape having a perimeter outline of 10 inches by 10 inches.

9. A speaker assembly comprising:
a sound opening;
a base housing comprising:
a first holding area; and
a second holding area;
a high frequency driver configured in the first holding area radiating directly through the sound opening;
a first low frequency driver configured to be installed within the second holding area, wherein when the first low frequency driver is installed within the second holding area a front holding space is formed at a front side of the first low frequency driver and a rear holding space is formed at a rear of the first low frequency driver; and
a second low frequency driver, wherein the first low frequency driver and the second low frequency driver are installed opposite each other, and wherein the first low frequency driver is driven in response to the second low frequency driver.

10. The speaker assembly of claim 9,
the base housing further comprising a third holding area, wherein the second low frequency driver is configured to be installed within the third holding area, wherein when the second low frequency driver is installed within the third holding area a front holding space is formed at a front side of the second low frequency driver and a rear holding space is formed at a rear of the second low frequency driver.

11. The speaker assembly of claim 9, wherein the front holding space radiates sound towards the high frequency driver through the sound opening.

12. The speaker assembly of claim 9, wherein the high frequency driver is positioned perpendicular to the first low frequency driver.

13. The speaker assembly of claim 9, further comprising:
a holding cylinder installed into the first holding area, the holding cylinder configured to hold the high frequency driver.

14. The speaker assembly of claim 13, wherein the holding cylinder is empty below the high frequency driver.

15. The speaker assembly of claim 9, wherein the front holding space is shaped to include a triangular shape.

16. The speaker assembly of claim 15, wherein an area of a top opening formed by the front holding space is less than an area of a woofer included in the first low frequency driver.

17. The speaker assembly of claim 9, wherein a space within the base housing is filled in to reduce an available interior volume of the base housing.

18. A speaker assembly comprising:
a sound opening;
a base housing comprising:
a first holding area; and
a second holding area;
a high frequency driver configured in the first holding area radiating directly through the sound opening;
a first low frequency driver configured to be installed within the second holding area, wherein when the first low frequency driver is installed within the second holding area a front holding space is formed at a front side of the first low frequency driver and a rear holding space is formed at a rear of the first low frequency driver; and
wherein the front holding space radiates sound towards the high frequency driver through the sound opening.

* * * * *